United States Patent [19]

Bodrogi

[11] Patent Number: 4,804,572
[45] Date of Patent: Feb. 14, 1989

[54] WALL COVERING WITH FLUOROCARBON STAIN RESISTANT TOP COATING

[75] Inventor: Steven I. Bodrogi, Plattsburgh, N.Y.

[73] Assignee: Imperial Wallcoverings, Inc., Beachwood, Ohio

[21] Appl. No.: 127,221

[22] Filed: Dec. 1, 1987

[51] Int. Cl.⁴ .......................... B32B 3/00; B32B 27/00; B32B 27/06; E04C 1/00

[52] U.S. Cl. .................................... 428/195; 428/203; 428/206; 428/207; 428/211; 428/421; 428/422; 428/904.4; 428/522; 52/309.17

[58] Field of Search ............... 52/309.7; 524/100, 287; 525/285, 293, 385; 428/195, 421, 422, 482, 904.4, 514, 518, 522, 203, 206, 207, 211; 427/331, 365, 372.2, 374.4, 385.5, 407.1

[56] References Cited

U.S. PATENT DOCUMENTS

| | | | |
|---|---|---|---|
| 3,574,656 | 4/1971 | Sauntson et al. | 428/904.4 |
| 3,843,579 | 10/1974 | Eanzel | 280/29.4 E |
| 3,854,871 | 12/1974 | Eanzel | 8/142 |
| 3,891,591 | 6/1975 | Chang et al. | 260/29.6 WB |
| 3,920,389 | 11/1975 | Eanzel | 8/142 |
| 3,992,347 | 11/1976 | Vary | 260/30.2 |
| 4,100,318 | 7/1978 | McCann et al. | 428/159 |
| 4,219,376 | 8/1980 | Roman | 156/209 |
| 4,306,990 | 12/1981 | Goodman et al. | 524/588 |
| 4,423,095 | 12/1983 | Blizzard | 427/387 |
| 4,603,074 | 7/1986 | Pate et al. | 428/482 |
| 4,656,214 | 4/1987 | Wickson | 524/287 |

*Primary Examiner*—Ellis P. Robinson
*Assistant Examiner*—P. J. Ryan
*Attorney, Agent, or Firm*—Bell, Seltzer, Park & Gibson

[57] ABSTRACT

A wall covering having a stain resistant outer surface comprises a reinforcing backing layer, an opaque vinyl polymer surfacing layer overlying a front surface of the backing layer, a layer of printing applied to the surfacing layer in selected areas to form a desired decorative pattern to the wall covering, and a stain resistant transparent top coating overlying the layer of printing and imparting stain resistant properties to the exposed outer surface of the wall covering. The top coating is comprised of at least one transparent vinyl polymer, a flattening pigment imparting a substantially non-glossy matte finish to the coating surface, and from about 0.1 to 4 percent by weight of a perfluoroalkyl copolymer, preferably a perfluoroalkyl methacrylate copolymer.

10 Claims, 1 Drawing Sheet

U.S. Patent     Feb. 14, 1989     4,804,572
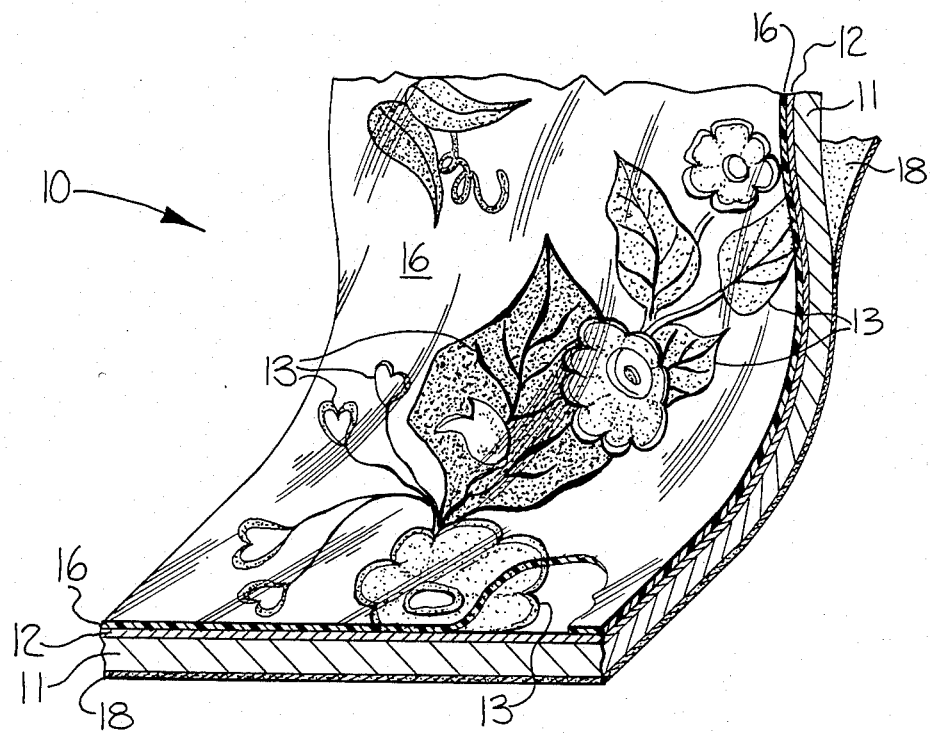

WALL COVERING WITH FLUOROCARBON STAIN RESISTANT TOP COATING

FIELD AND BACKGROUND OF THE INVENTION

This invention relates to wall coverings, and more particularly to a wall covering which is specially constructed to have a stain resistant outer surface.

The desirability of having a wall covering with a stain resistant outer surface has been previously recognized, and several approaches have been taken to imparting stain resistant properties to wall coverings. It is known, for example, to laminate to the outer surface of a wall covering a film of polyvinyl fluoride to provide a washable surface to the wall covering. However, this approach undesirably adds to the expense of the wall coverings since it requires a separate laminating step following the manufacture of the wall covering.

Stain resistant top coatings have also been provided on wall coverings. However, the stain resistant coatings typically impart a relatively glossy finish to the wall covering. Many popular styles and grades of wall paper require a low gloss or substantially matte finish. This low gloss is usually achieved by incorporating flattening pigments, such as silicate pigments or silica, in the top coating composition. However, the presence of such pigments causes the surface of the coating to be porous and consequently works against obtaining stain resistance.

Accordingly, it is an object of the present invention to provide a stain resistant wall covering having desirable aesthetic qualities of low gloss on the outer surface thereof coupled with excellent stain resistant properties.

In accordance with the present invention there is provided a stain resistant wall covering comprising a backing layer, a surfacing layer formed of a polymer coating overlying one surface of said backing layer, a layer of printing applied to said surfacing layer and imparting a desired decorative pattern to the wall covering and a stain resistant transparent top coating overlying said layer of printing and imparting stain resistant properties to the exposed surface of the wall covering, said top coating comprising at least one polymer or copolymer derived from vinyl monomers and from about 0.1 to 4 percent by weight based upon the dried coating weight of a perfluoroalkyl copolymer.

BRIEF DESCRIPTION OF THE DRAWINGS

Some of the features and advantages of the invention having been stated other will become apparent as the description proceeds, and taken in conjunction with the accompanying drawing in which the FIGURE is a schematic view showing a wall covering in accordance with the present invention.

DETAILED DESCRIPTION OF THE DRAWINGS

Referring now more particularly to the drawings, a wall covering in accordance with the present invention is indicated generally by the reference character 10. The wall covering includes a reinforcing substrate or backing layer 11, which is coated on one surface with a surfacing layer 12 to form a smooth background surface which is receptive to printing. A layer of printing 13 is applied directly to the surfacing layer 12. Depending upon the particular pattern involved and the number of colors employed, the printing layer 13 may extend either over the entire surface or over selected portions only of the surfacing layer 12. When multiple colors are employed, the printing layer 13 may include areas where multiple colors overlie one another. Overlying the printing is a transparent stain resistant top coat layer 16 which extends over substantially the entire outer surface of the sheet. The wall covering may optionally include a water soluble paste coating 18 on the rear surface of the backing.

The reinforcing substrate or backing 11 may be of any suitable material known in the art for use in manufacturing wall coverings. The backing may, by way of example, be formed from groundwood semi-bleached mechanical pulp. Other materials which are conventionally used in wallpaper construction include woven or non-woven scrims, spun bonded sheets formed of synthetic fibers or filaments, chemical pump sheets or the like. The basis weight of the backing layer may typically range from about 57 to about 174 grams per square meter.

The surfacing layer 12 imparts a smooth ink receptive surface to the sheet and also serves to impart opacity. The surfacing layer is preferably a polymer coating composition, formed from one or more vinyl monomers such as vinyl chloride and vinyl esters. The surfacing layer may, for example, comprise a polyvinyl chloride plastisol composition or a polyvinyl chloride-acrylic copolymer composition. The vinyl polymer composition preferably contains a relatively high proportion of suitable opacifying pigments or fillers, such as calcium carbonate, kaolin, talc, aluminum hydroxide, or titanium dioxide, to impart high opacity. Coating/surfacing compositions of this type are commercially available from a number of sources, and the selection of a suitable coating/surfacing composition is within the skill of the artisan in this field. The weight of the surfacing layer on the backing may typically range from about 5 to about 800 grams per square meter. The surfacing layer is applied by conventional coating equipment such as a blade coater, direct or reverse roll coater, etc. The coating is thereafter dried by hot air or casting on a heated drum, and may then be calendered to form a smooth surface suitable for gravure printing.

The printing layer is applied by conventional printing methods, such as for example by gravure printing. Selection of the particular inks employed is within the skill of a person working in this field, depending upon the particular type of printing involved and the colors and patterns employed.

The top coat layer 16 is applied after application and drying of the printing layer 14, and is applied as a solvent based coating composition by any suitable coating method such as by rollers, a reverse roll coater, or preferably by gravure printing.

The top coating composition is a volatile solvent-based composition predominantly comprised of one or more polymers derived from vinyl monomers such as vinyl chloride or vinyl esters. Examples of vinyl esters include vinyl acetate, vinyl propionate, vinyl butyrate, vinyl pivilate, vinyl laurate and vinyl versatate, with vinyl acetate being preferred. The vinyl monomers may be copolymerized with other monomers such as unsaturated carboxylic acid esters, including acrylic acid and methacrylic acid, and/or alpha-olefin monomers, including ethylene and propylene. The top coating polymers have a molecular weight range from 15,000 to 500,000 and glass transition temperatures ($T_g$) ranging from 20 °C. to 105° C. The polymer or polymer mixture is dissolved in one or more volatile organic solvents such as toluene, methylethyl ketone, methyl isobutyl ketone, ethanol and mixtures thereof. When coated onto the wall covering and dried, the polymer forms a smooth transparent flexible film.

The top coating composition also contains a solvent-based perfluoroalkyl copolymer stain and soil repellant. Particularly suitable for use in the present invention are commercially available solvent-soluble polymers and copolymers of perfluoroalkyl acrylates or methacrylates. Examples of polymerizable perfluoroalkyl acrylate or methacrylate monomers include those having the formula: $R_fROCOCR'=CH_2$ wherein $R_f$ represents a straight or branched perfluoroalkyl group containing 3 to 15 carbon atoms; R is an alkylene group containing 1 to 10 carbon atoms; and R' is hydrogen or a methyl group. Suitable solvent-based perfluoroalkyl stain and said repellant polymers include those commercially available from E. I. DuPont de Nemours & Co., Inc., of Wilmington, Delaware, under the designation Teflon ® SBA Soil and Stain Repellant.

The solvent-based fluoropolymer solution should be added to the vinyl polymer solution in an amount sufficient to provide in the dried top coating layer a fluoropolymer content of about 0.5 to 4 percent by weight.

The top coating composition also includes suitable flattening pigment for forming a dull or substantially matte finish to the dried coating. Suitable flattening pigments include silica compounds and silicates such as amorphous silicon dioxide and aluminum silicate. The flattening pigment is added to the top coating composition in an amount sufficient to achieve a flat or substantially matte finish. More particularly, the dried to coating should desirably have a 60° gloss meter reading of no more than 8 percent. The specific weight percent of flattening pigment required to achieve this low gloss finish may vary depending upon the specific flattening pigments employed, and other factors, but can be readily determined.

The coating composition may also include other additives and agents, including anti-blocking agents such as microcrystalline waxes, polyethylene waxes, etc.

The resulting wall paper surface is highly resistant to stains and soiling. Most common stains can be readily removed from the wall paper by scrubbing. For best cleaning results, rubbing alcohol (isopropyl alcohol) or full strength cleaners containing pine oil (minimum 19 percent) should be used. Lacquer thinners, nail polish removers or other solvents should be avoided, and cleaning agents containing sodium hypochlorite (bleach) should be avoided since they could cause discoloration. The surface is cleaned with a soft non-abrasive cloth, damp sponge or soft brush. After the stain is removed, the surface should be wiped with clean water.

The following example illustrates how a stain resistant wall covering in accordance with the invention is produced.

EXAMPLE 1

A printed decorative wall covering was prepared as follows. A 90 gram per square meter groundwood semi-bleached mechanical pulp paper sheet was coated on one surface with 90 grams per square meter of a polyvinyl chloride plastisol paper surfacing composition containing titanium dioxide and calcium carbonate to impart an opaque white surface appearance, fused at 160° C. on a chrome plated steam heated drum for 4 seconds and was thereafter calendered to form a smooth opaque white ink receptive surface. The substrate was then printed with a floral or geometric pattern by roto-gravure printing with solvent or water based gravure inks, and the inks were aire dried by heating at 38° to 82° C. for 3.5 seconds per station.

A stain resistant top coating formulation was produced by mixing the following ingredients:
Clear base 194 lbs.
Fluoropolymer 8 lbs.
Methylisobutylketone solvent 169 lbs.

The clear base comprised a 26.9 percent solids solution of a polyvinyl/acrylic copolymer in a volatile organic solvent mixture containing toluene, methyl isobutyl ketone and methyl ethyl ketone. The copolymer had a glass transition temperature (Tg) of approximately 66.2° C.

The fluoropolymer comprised a 12 percent solids solution containing about 5-10 percent by weight perfluoroalkylmethacrylate copolymer and about 1-5 percent of a polyfunctional perfluoroalkyl ester in a volatile organic solvent comprising about 80 percent trichlorotrifluoroethane, about 1-5 percent methyl isobutyl ketone and about 1-5 percent 1,1,1-trichloroethane. The composition had a boiling point of 48°C. and a specific gravity of 1.5.

The coating composition was applied to the wall covering substrate by a gravure roll and the solvent was thereafter evaporated by heating in air at 38° to 66° C. for 3.5 seconds to form a stain resistant coating of approximately 3.5 grams per square meter.

EXAMPLE 2

Strips of wall covering produced as described in Example 1 were tested for their stain repellant properties by applying a series of staining materials to the samples and then cleaning after 15 minutes with a ½ percent Ivory soap solution, isopropyl rubbing alcohol, and a pine oil cleaner. The results are set forth below in Table 1.

TABLE 1

| Cleaner | 0.5% Ivory Soap | Isopropyl Rubbing Alcohol | Pine Oil Cleaner |
| --- | --- | --- | --- |
| Steak Sauce | Excellent | Excellent | Excellent |
| Butter | Excellent | Excellent | Excellent |
| Coffee | Excellent | Excellent | Excellent |
| Cooking Oil | Excellent | Excellent | Excellent |
| Crayon | Good | Excellent | Excellent |
| Furniture Polish | | | |
| "Lemon Oil" | Excellent | Excellent | Excellent |
| "Scratch Formula" | Fair–Good | Fair–Good | Very Good |
| Grape Jelly | Excellent | Excellent | Excellent |
| Chocolate Syrup | Excellent | Excellent | Excellent |
| Ink (waterbased fountain pen, blue-black) | Good | Excellent | Excellent |
| Iodine Tincture (medical grade, 46% alcohol) | Excellent | Excellent | Excellent |
| Ketchup | Excellent | Excellent | Excellent |
| Lipstick | Good | Excellent | Excellent |
| Marker (solvent based) | Poor | Poor | Fair–Good |
| Milk | Excellent | Excellent | Excellent |
| Mustard | Excellent | Excellent | Excellent |
| Oil (cooking oil with red dye) | Good | Excellent | Excellent |
| Orange Juice | Excellent | Excellent | Excellent |
| Shoe Conditioners | | | |
| Shoe Cream | Fair | Fair | Fair–Poor |
| Shoe Polish | Poor | Poor | Poor |

TABLE 1-continued

| Cleaner | 0.5% Ivory Soap | Isopropyl Rubbing Alcohol | Pine Oil Cleaner |
| --- | --- | --- | --- |
| Spaghetti Sauce | Excellent | Excellent | Very Good |
| Tea | Excellent | Excellent | Excellent |
| Vanilla Extract | Excellent | Excellent | Excellent |
| Vinegar | Excellent | Excellent | Excellent |
| "Red Wine" Worchestershire Sauce | Excellent | Excellent | Excellent |
| Ballpoint Pen | | | |
| Black | Good | Excellent | Excellent |
| Blue | Poor | Good | Excellent |
| Merthiolate | Fair-Good | Excellent | Excellent |

That which is claimed is:

1. A stain resistant wall covering comprising
a reinforcing backing layer,
a surfacing layer formed of a polymer coating overlying a front surface of said backing layer,
a layer of printing applied to said surfacing layer in selected areas and imparting a desired decorative pattern to the wall covering, and
a stain resistant transparent top coating overlying said layer of printing and imparting stain resistant properties to the wall covering, said top coating comprising at least one polymer derived from vinyl monomers and from about 0.1 to 4 percent by weight of a perfluoroalkyl polymer, and a flattening pigment for imparting a non-glossy matte finish to the top coating.

2. A wall covering according to claim 1 wherein said top coating has a 60° gloss meter reading of no more than 8 percent.

3. A wall covering according to claim 1 wherein said top coating includes a polyvinyl chloride-acrylic copolymer.

4. A wall covering according to claim 1 wherein said at least one polymer derived from vinyl monomers has a glass transition temperature of from 20° C. to 105° C.

5. A wall covering according to claim 1 wherein said perfluoroalkyl polymer is derived from a perfluoroalkylmonomer having the formula $R_fROCOCR'=CH_2$ wherein $R_f$ represents a straight or branched perfluoroalkyl group containing 3 to 15 carbon atoms; R is an alkylene group containing 1 to 10 carbon atoms; and R' is hydrogen or a methyl group.

6. A wall covering according to claim 1 wherein said perfluoroalkyl polymer comprises a perfluoroalkylmethacrylate copolymer.

7. A wall covering according to claim 5 wherein said stain resistant top coating also includes a polyfunctional perfluoroalkyl ester.

8. A wall covering according to claim 1 additionally including a water soluble paste coating applied to the rear surface of said backing layer.

9. A stain resistant wall covering comprising
a reinforcing backing layer,
a pigmented substantially opaque vinyl polymer surfacing coating overlying one surface of said reinforcing coating,
a layer of printing applied to said vinyl polymer surfacing coating in selected areas and imparting a desired decorative pattern to the wall covering, and
a stain resistant transparent top coating overlying said layer of printing and said vinyl polymer surfacing coating and imparting stain resistant properties to the wall covering, said top coating comprising a blend of a transparent vinyl polymer and from about 0.1 to 4 percent by weight of a perfluoroalkyl polymer, and a flattening pigment for imparting a non-glossy matte finish to the top coating.

10. A stain resistant wall covering comprising
a reinforcing backing layer,
a surfacing layer formed of a pigmented, substantially opaque polymer coating overlying a front surface of said backing layer,
a layer of printing applied to said surfacing layer in selected areas and imparting a desired decorative pattern to the wall covering, and
a substantially non-glossy stain resistant transparent top coating overlying said layer of printing and imparting stain resistant properties to the wall covering, said top coating comprising at least one transparent vinyl polymer, a flattening pigment in an amount sufficient to impart to the top coating a substantially non-glossy finish with a 60° gloss meter reading of no more than 8 percent, and from about 0.1 to 4 percent by weight of a perfluoroalkylmethacrylate polymers.

* * * * *

UNITED STATES PATENT AND TRADEMARK OFFICE
CERTIFICATE OF CORRECTION

PATENT NO. : 4,804,572

DATED : February 14, 1989

INVENTOR(S) : Steven I. Bodrogi

It is certified that error appears in the above-identified patent and that said Letters Patent is hereby corrected as shown below:

Column 1, line 51, "other" should be -- others --.

Column 1, line 52, "conjunction" should be -- connection --.

Column 2, line 17, "pump" should be -- pulp --.

Column 4, Line 5, "aire" should be -- air --.

Column 6, line 46, "polymers" should be -- polymer --.

Signed and Sealed this

Twentieth Day of June, 1989

Attest:

DONALD J. QUIGG

Attesting Officer

Commissioner of Patents and Trademarks